Patented July 29, 1947

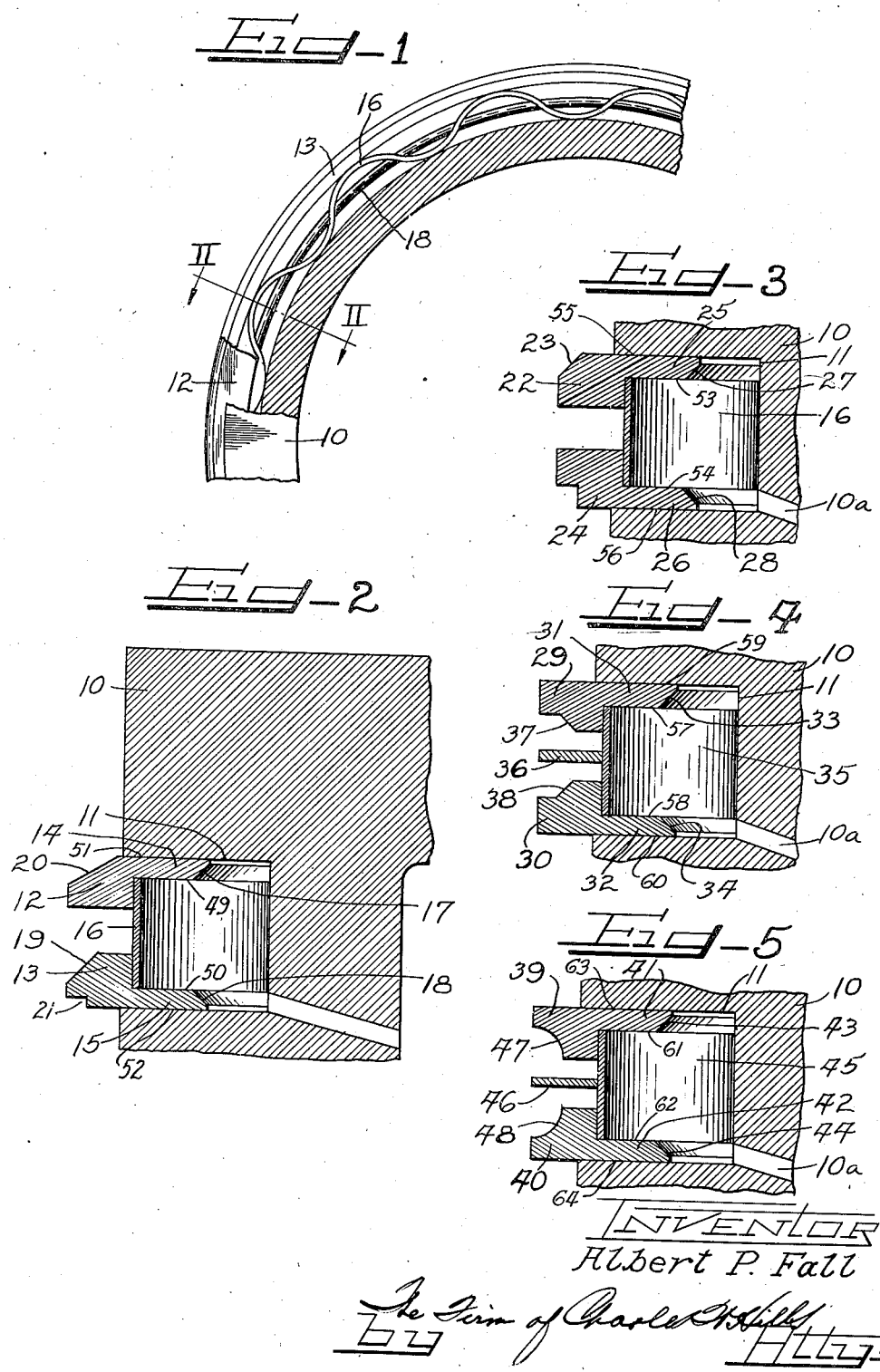

2,424,881

UNITED STATES PATENT OFFICE 2,424,881

PISTON RING ASSEMBLY

Albert P. Fall, Toledo, Ohio

Application September 30, 1944, Serial No. 556,504

1 Claim. (Cl. 309—45)

This invention is directed to improved piston rings and improved piston ring assemblies.

Piston rings, and piston ring assemblies, perhaps more than any other part of an internal combustion engine, govern the two most important factors in the operation thereof, namely, the power output and the cost of operation as measured by fuel consumption. The factors which enter into the determination of power output of a given engine and the cost of operation thereof are, proper fit of the piston ring within the piston groove during the installation thereof, the smooth riding of the piston rings over an extremely thin film of oil on the cylinder wall during operation, the removal of excess oil from the cylinder wall during reciprocation of the piston and free and unobstructed disposal of the oil so removed from the cylinder wall together with the efficient removal of deposits of carbon and the like and disintegration thereof during piston operation.

Another important factor in the construction of a piston ring and piston ring assembly is involved in the provision of a structure which, when installed in a motor that has already been operated, will not be effected by the inefficiency of the previously used piston ring assembly often manifested by irregular grooves worn in the cylinder wall at the ends of the piston stroke thereon. In the past it has been found that these many and varying problems involved with the manufacture of piston ring assemblies cannot be taken care of by any single structural feature in the assembly but rather are solved by a combination of structural features embodied in a single construction. These features all contribute however to the single end of proper and efficient removal of oil and the efficient movement of the piston over the cylinder wall.

It is an important object of the present invention to provide an improved piston ring assembly in which the rings, during operation of the piston, are enabled to ride over an extremely thin film of oil on the cylinder wall in a more efficient manner.

It is still another object of the present invention to provide an improved piston ring assembly in which there is provided improved means for efficiently removing and disposing of excess oil which collects upon the cylinder wall, whereby the desired thin film of oil is maintained constantly upon the cylinder wall to ensure continued smooth operation.

It is still another object of the present invention to provide an improved piston ring construction having means for efficiently removing from the cylinder wall, disintegrating and disposing of, accumulated solid material such as carbon and the like whereby the desired thin film of oil may be maintained upon the cylinder wall free from solid particles at all times.

Another factor in the construction and operation of piston ring assemblies is the efficiency with which the rings may be assembled with the piston and with the associated expander or other appurtenant parts without being damaged by forcing or by the use of tools.

It is a further object of the present invention to provide a ring which may be readily and easily inserted in the piston beyond the expander ring in an improved manner.

More specifically, it is an object of the present invention to provide a piston ring assembly in which there is incorporated a pair of spaced segments formed in a novel manner to facilitate removal of excess oil and carbon from the cylinder wall and to efficiently dispose of this removed material and also which is arranged to ride over the thin film of oil left on the cylinder wall and to avoid contact with circular grooves cut in the cylinder wall at the ends of the piston strokes by formerly used ring assemblies.

Many other objects and advantages of the invention will become apparent from the following description and accompanying drawing, in which:

Figure 1 is a fragmentary, horizontal cross-sectional view of a piston ring construction embodying a form of my invention;

Figure 2 is an enlarged, fragmentary cross-sectional view taken along the lines II—II of Figure 1 in which a portion of the cylinder is shown; and Figures 3, 4 and 5 are views similar to Figure 2 of modified forms of my invention.

It will be understood that the embodiments shown herein are for illustrative purposes only and may be changed or modified without departing from the spirit and scope of the invention as set forth in the appended claim.

As shown best in Figure 2, the piston 10 is grooved as at 11 in the usual manner to receive a piston ring assembly which, in this embodiment, includes an upper segment or rail 12 and a lower segment or rail 13 which are spaced apart from one another as shown. There is also provided for the groove 11, a plurality of drain passages, one of which is shown at 10a.

Each of the rails 12 and 13 is provided with enlarged radially outer portions and radially inwardly extending flange 14 and 15 respectively, the opposed faces of which engage over the respective edge of a suitable expander 16, the expander pressing outwardly against a shoulder formed on the enlarged portions of the rails to urge the assembly outwardly into cylinder wall engagement. As will be seen from the drawing, each of the segments 12 and 13 is provided at the radially inner edge of the respective flanges 14 and 15 thereof with inwardly sloping beveled surfaces 17 and 18 respectively. These surfaces, it will be seen, serve to aid in the assembly of the parts upon the piston 10. Assuming that the expander ring 16 has been inserted in the groove 11 or remains there from the previous installation, the insertion of the flange 15 of the segment 13 will result in a cam engagement between the lower edge of the expander ring 16 and the beveled edge 18 whereupon the expander will, by virtue of inward movement of the flange 15 of the segment, be caused to ride upwardly. The beveled surface 17 of the segment 12 likewise serves as a lead for the insertion of the segment 12 and particularly the flange 14 thereof into the position shown in Figure 2.

With such a construction it will be seen that the segments 12 and 13, even though they completely fill the depth of the piston groove 11 not spanned by the width of the expander ring 16, may easily and precisely be inserted manually beyond the upper and lower edges of the expander without the use of any tools whatsoever.

Another and further advantage of the bevels 17 and 18 are the part they play in disposing of oil and carbon removed from the cylinder wall which accumulates between the flanges 14 and 15. As is well known the piston, during use, reciprocates at a very high rate of speed. Thus any oil or carbon accumulated behind the expander ring 16 in the groove 11 will, by virtue of the inclined position of surfaces 17 and 18 be rapidly progressed radially inwardly of the groove toward the drain passages 10a. Thus the bevels 17 and 18 serve to augment the other oil disposal features of my piston ring construction to be described presently.

To initiate a rapid and complete disposal of excess oil and carbon scraped from the cylinder wall, the rings 12 and 13 are spaced apart from one another and maintained in this relationship by the expander ring 16. Furthermore, the annular space defined by the adjacent portion of the cylinder wall, the opposed faces of the radially outer parts of the rings 12 and 13 and the exposed outer face of the expander 16 is increased in size to permit freer flow of the excess oil and carbon by virtue of a bevel face 19 on the outer, upper side of the ring 13.

The assembly is completed by the provision of a beveled face 20 at the outer, upper edge of the piston ring 12 and a circular cutaway or recess 21 at the outer, lower edge of the ring 13. The beveled face 20 enables the assembly to ride smoothly upwardly in the piston while the recess 21 insures that the present assembly will not engage with cuts or grooves previously made in the cylinder wall by a previous conventional ring assembly.

From the foregoing it will be seen that there is provided herein a multi-part piston ring assembly in which the rings 12 and 13 may be readily and easily inserted around the expander ring 16 by virtue of bevel faces 17 and 18 at the inner end of flanges 14 and 15 thereof respectively. Furthermore, the rings are so arranged as to afford free and continuous flow of excess oil and carbon scraped from the cylinder wall by the lower, outer circular edge of the ring 12, this excess oil and carbon passing into the piston groove and there being progressed radially inwardly during rapid reciprocation of the piston by virtue of forced flow thereof over the inwardly beveled faces 17 and 18.

In the construction shown in Figure 3, the expander ring 16 and the upper rail or ring 22 are similar to that shown at 12 in Figure 2 except that the beveled face 23 at the upper, outer edge thereof is disposed at a somewhat more acute angle than the surface 20 on the ring 12. In this construction the lower ring 24 is similar to the ring 13 of Figure 2 except that the upper, outer edge thereof is not beveled but rather is formed at a right angle to serve more efficiently as a scraper. Here again the inwardly extending flanges 25 and 26 of the rings 23 and 24 respectively are provided with respective inner beveled edges 27 and 28 which function similarly as those shown at 17 and 18 in Figure 2.

In the construction shown in Figure 4 the opposed rings 29 and 30 are identical in order that they may be interchanged if desired and in order that the excess oil and carbon removed from the cylinder may be efficiently progressed radially inwardly during reciprocation of the piston. Rings 29 and 30 are each provided with inwardly extending flanges 31 and 32 respectively, each flange having an inner beveled face 33 and 34 respectively which functions similarly to those shown at 17 and 18 in Figure 2. The expander ring 35 serves to maintain the rails 29 and 30 apart from one another and, if desired, a scraper, floating ring 36 may be inserted between opposed faces of the outer parts of the rings 29 and 30. These rings are each provided with cut back recesses having inclined, generally radially outwardly exposed faces 37 and 38 which cooperate with each other and with the floating ring 36 to aid in the disposal of excess oil and carbon scraped from the cylinder wall during operation of the piston.

The floating ring 36 is of the character of that shown in my Patent No. 2,349,903 directed to a piston ring assembly and issued May 30, 1940.

In the construction of Figure 4, as the piston reciprocates it will be seen that the inner lower and upper edges respectively of the rings 29 and 30 serve to remove excess oil and carbon from the cylinder wall, this excess oil and carbon being accumulated in the space between the rings. Any tendency of the carbon or oil to clog or cease to flow from that space is alleviated by the opposite reciprocation of the ring 36 which is also serving to clean the cylinder wall. In other words, the ring 36 maintains a condition of turbulence between the rings 29 and 30 and thus the material constantly flows into the groove 11 behind the expander ring 35 where it is progressed inwardly by surfaces 33 and 34 in the manner previously described. It will also be understood that the beveled edges 33 and 34 serve to aid in the assembly of the device as set forth in conjunction with the construction of Figure 2.

In the construction shown in Figure 5, the piston rings 39 and 40 are substantially similar to those shown in Figure 4 in that they are provided with radially inwardly extending flanges 41 and 42 having beveled inner edges 43 and 44 respectively. There is also provided an expander ring 45 arranged to press the rings outwardly by engagement against inwardly facing shoulders at an intermediate part of the ring. Preferably a floating scraper ring 46 is provided between the rings 39 and 40 and functions in a manner similar to that shown at 36 in Figure 4. In this construction the outer lower and upper edges respectively of the rings 39 and 40 are provided with an arcuate recess 47 and 48 respectively which increase the annular space between the rings and aid in the deflection inwardly of excess oil and carbon removed from the cylinder wall by the rings 39 and 40 and the floating ring 46. Here again the bevels 43 and 44 aid in permitting rapid and efficient assembly of the structure and also aid in the progression of accumulated excess oil toward the inner drain side of the piston groove.

The portions of the several ring segments outwardly of expanders, are herein termed the overhanging portions. The portions of the segments between the expander and the bevel, are herein termed the bearing portions. The portions of the segments inwardly of the bearing portions are herein termed the wedge portions.

It is to be noted that the inner surfaces 49 and 50 of the bearing portions of the segments 14 and 15 are parallel to the outer surfaces of faces 51 and 52 respectively of these segments. Likewise, the inner faces 53 and 54 of the bearing portions of the segments of Fig. 3 are parallel to the outer faces 55 and 56 of the segments. In like manner, the inner faces 57 and 58 of the segments shown in Fig. 4, of the bearing portions, are parallel to the outer faces 59 and 60 of said segments. The inner faces 61 and 62 of the bearing portions of the segments of Fig. 5 are parallel to the outer faces 63 and 64 of said segments.

It is to be noted that when the composite piston ring assembly of the present invention is completed in a piston ring groove, the edges of expanders do not have any contact whatsoever with the inclined surfaces of the several wedge portions.

The wedge portions are provided for ease in assembling the composite ring structure, as the wedge portions of the segments are inserted between the edges of the expander and the adjacent side surfaces of the ring grooves so that the edges of the expanders may engage only the parallel inner faces or surfaces of the bearing portions of the segments when the assembly is completed.

The bearing portions of the segments are sometimes herein referred to as the overlapping portions.

I claim as follows:

A composite piston ring assembly comprising a pair of axially spaced ring segments, an axially rigid expander spacing said segments in the ring groove of a piston; each segment including an overhanging portion, a bearing portion, and a wedge; the overhanging portion constituting that part of the segment outwardly of the expander which contacts a cylinder wall, the bearing portion constituting that part of the segment between the top or bottom of the expander and the top or bottom of a ring groove, the wedge portion constituting that part of the segment which is radially inwardly from the bearing portion and which is forced between an edge of the expander and the adjacent wall of a groove to complete the assembly and which is out of contact with the expander when the assembly is completed.

ALBERT P. FALL.

REFERENCES CITED

The following references are of record in the file of this patent:

UNITED STATES PATENTS

| Number | Name | Date |
| --- | --- | --- |
| 2,229,578 | Malpas | Jan. 21, 1941 |
| 1,708,816 | Williams | Apr. 9, 1929 |
| 2,025,299 | Mitchell | Dec. 24, 1935 |
| 1,801,056 | Saks | Apr. 14, 1931 |
| 2,288,911 | Marien | July 7, 1942 |
| 2,236,721 | Teetor | Apr. 1, 1941 |
| 2,273,703 | Gille | Feb. 17, 1942 |
| 2,169,613 | Niederlehner | Aug. 15, 1939 |
| 2,179,670 | Richards | Nov. 14, 1939 |
| 2,349,903 | Fall | May 30, 1944 |
| 2,034,770 | Porter | Mar. 24, 1936 |
| 2,329,950 | Smith | Sept. 21, 1943 |
| 1,903,107 | Grant | Mar. 28, 1933 |